United States Patent Office 3,463,277
Patented Aug. 26, 1969

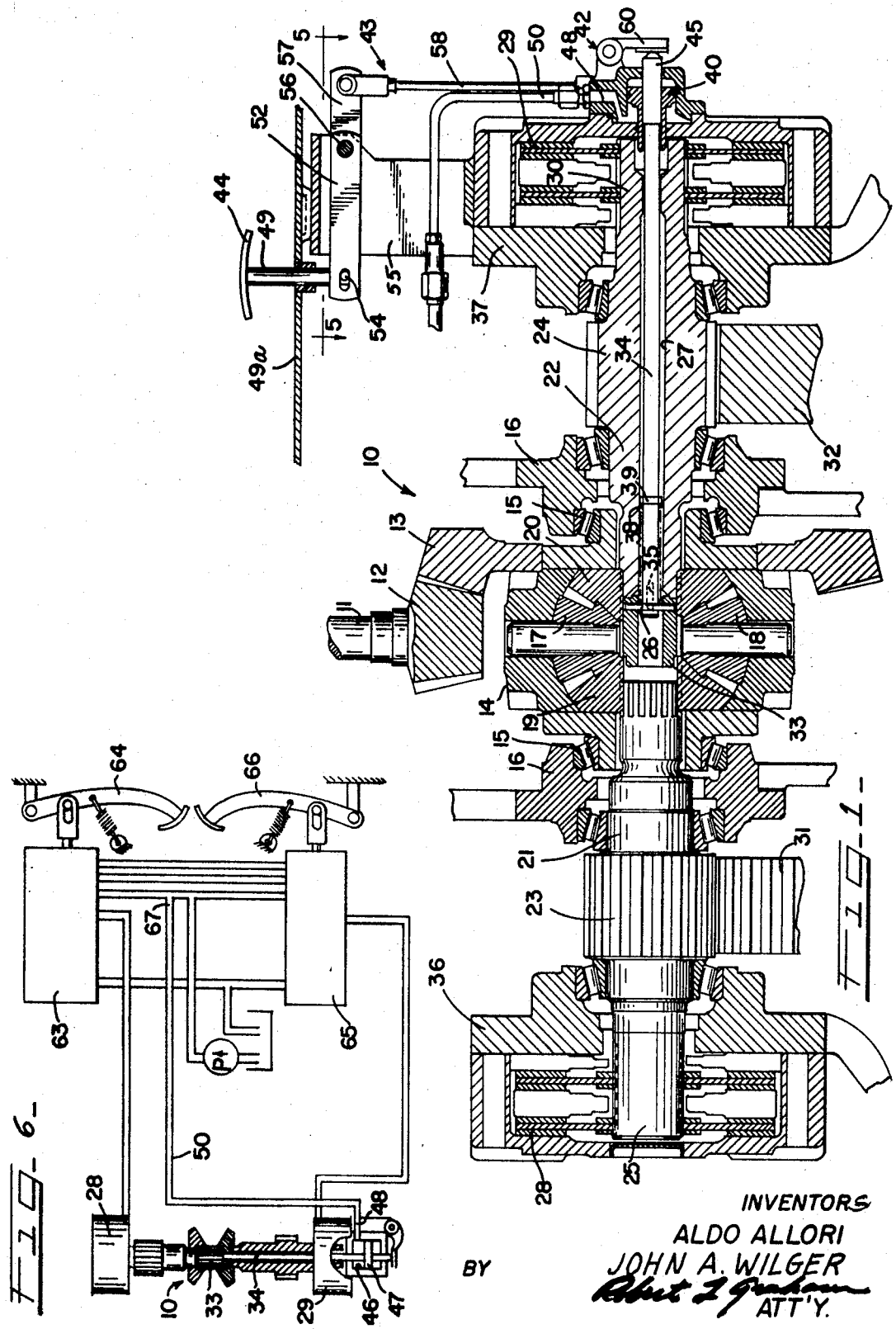

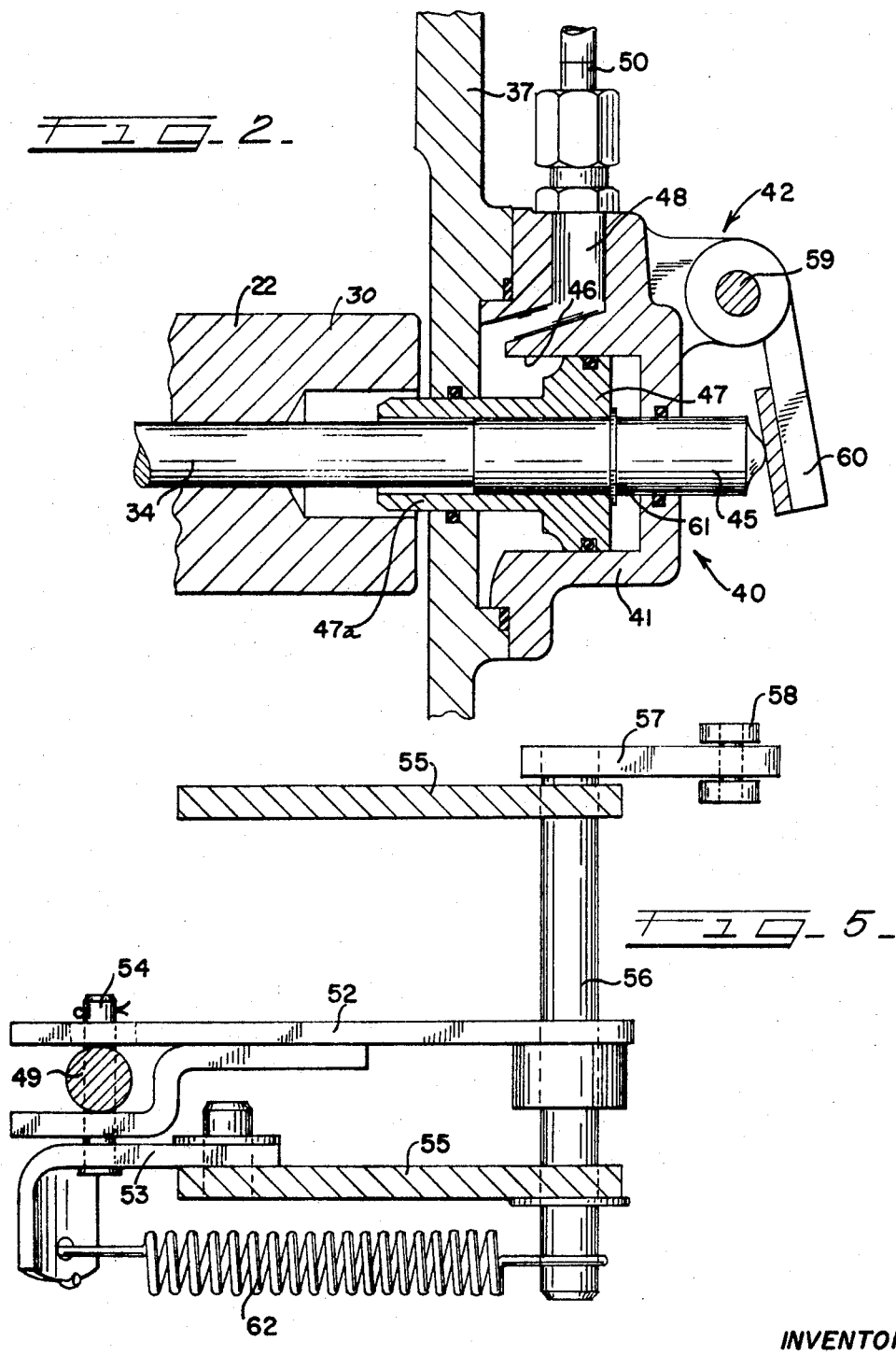

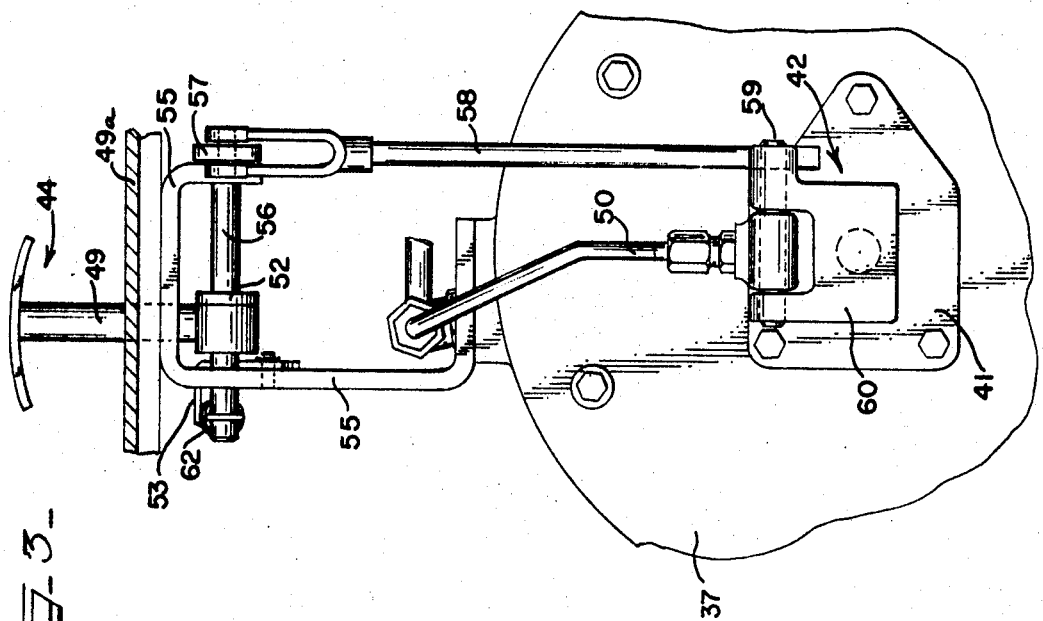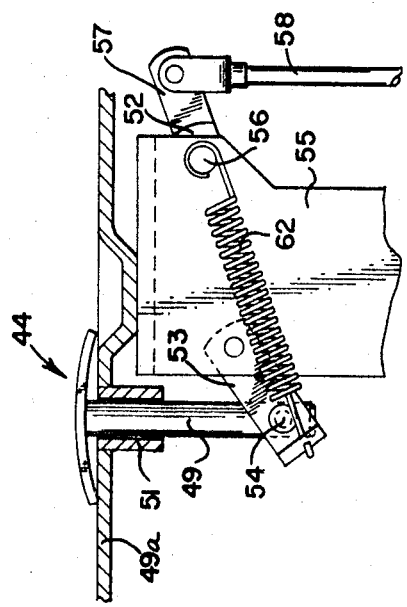

3,463,277
BRAKE RELEASED DIFFERENTIAL LOCK
Aldo Allori, Brookfield, and John A. Wilger, Chicago, Ill., assignors to International Harvester Company, Chicago, Ill., a corporation of Delaware
Filed Mar. 26, 1968, Ser. No. 716,176
Int. Cl. F16d *41/24;* F16h *57/00;* B60k *17/00*
U.S. Cl. 192—4                                                      8 Claims

ABSTRACT OF THE DISCLOSURE

A differential lock for use with tractors and having a mechanical linkage for shifting the locking member to the locked position, and a hydraulic cylinder connected in circuit with the tractor brake system for shifting the locking member to the unlocked position in response to actuation of the tractor brakes.

Background and summary of the invention

This invention relates in general to differential locks and more specifically to differential locks for use with tractors and operatively responsive to the application of the tractor brakes.

Differential locks are commonly used on tractors to prevent differential action under particular types of driving conditions. For example, when the vehicle encounters a slippery surface, the wheel having the least traction receives all the input power whereas the wheel having the better traction receives none of the input power. The differential lock prevents differential action by interlocking the driving axles so that the driving wheels rotate as a unit. Input power is thusly delivered to the wheel having better traction thereby enhancing the chances of removing the vehicle from the difficult area.

Upon being removed from the difficult area it is desirable that the differential lock be disengaged so that turns can be made in the normal manner. An object of the present invention is to provide controls for automatically unlocking the differential. Another object is to provide differential lock controls operatively responsive to actuation of tractor brakes.

The invention as described herein contemplates the use of manual controls for locking the differential and hydraulic controls for unlocking the differential. The hydraulic controls are connected in circuit with the tractor hydraulic brake system so that actuation of the tractor brakes automatically actuates the differential unlocking means.

The differential lock comprises a member disposed internally of the differential, and movable to positively interlock the side bevel gears. A rod interconnects the locking member and the aforementioned manual and hydraulic controls. Thus, when slippery conditions are encountered, the opeartor manually actuates the manual controls which positively locks the differential. The differential remains in the locked position until the hydraulic brakes are applied.

Description of the drawings

FIGURE 1 is a longitudinal sectional view of the differential and lock assemblies;

FIGURE 2 is an enlarged fragmentary view of a portion of the differential lock shown in FIGURE 1;

FIGURE 3 is an end view of the differential lock shown in FIGURE 1 and illustrating a portion of the control linkage;

FIGURE 4 is a side view of a portion of the control linkage shown in FIGURE 3;

FIGURE 5 is a sectional view of the control linkage shown in FIGURE 4 and taken generally along line 5—5 of FIGURE 1; and FIGURE 6 is a diagrammatic view showing the relationship of the differential, the differential lock, and the vehicle brake system.

Description of the preferred embodiment

With reference to FIGURE 1, a conventional differential 10 is shown drivingly connected to a tractor drive shaft 11 by means of intermeshing bevel gears 12 and 13. The differential 10 is journaled to a differential carrier 16 by means of tapered roller bearings 15, 15. The differential 10 includes the conventional differential pinions 17 and 18 pinned to a differential case 14. Side gears 19 and 20 are arranged in intermeshing relation with the pinion 17 and 18 and are respectively mounted for co-rotation with pinion shafts 21 and 22. The pinion shafts 21 and 22 each extend coaxially into their corresponding side gears 19 and 20 terminating at about the midpoints thereof. The shafts 21 and 22 extend outwardly from the differential case and terminate at outer ends 25 and 30 which, respectively, are arranged to cooperate with conventional hydraulically actuated brakes shown generally as 28 and 29 and encased in brake housings 36 and 37. Mounted on intermediate portions of shafts 21 and 22 are bull pinions 23 and 24, respectively, which cooperate with bull gears 31 and 32 for driving the tractor rear axles (not shown).

A differential locking member 33 is mounted internally of the differential 10 and intermediate the confronting side gears 19 and 20. The locking member 33 is particularly constructed with external splines which mate with internal splines of side gears 19 and 20, and is adapted to move from an unlocked position wherein the member 33 meshes with the splines of side gear 20 to a locked position wherein the member 33 meshes with the splines of both the side gears 19 and 20. It is thusly seen that the member 33 in the locked position unites the side gears 19 and 20 into a co-rotating unit thereby overcoming the differential action of the differential 10.

The locking member 33 is actuated between its operative positions by means of an actuator 34 which interconnects the member 33 and the control means to be discussed presently. Extending longitudinally through the shaft 22 is an axial bore 27 through which passes the actuator 34. The inner end of actuator 34 has formed therein an elongate slot 35 through which passes a pin 26 secured to the locking member 33. The pin 26 is urged against the inner extremity of slot 35 by means of a compression spring 38 which has its outer end anchored to the actuator 34 by means of a collar 39. The actuator 34 extends through the axial bore 27, through the brake housing 37 and terminates at outer end 45.

Manual control means are provided for moving the locking member 33 to the locking position and comprise generally a bell crank 42 engageable with the outer end 45 of the actuator 34, a pedal 44 conveniently located relative to the operator, and a linkage shown generally as 43 interconnecting the pedal 44 and the bell crank 42.

Hydraulic control means are provided for moving the locking member 33 to the unlocked position and include generally a hydraulic cylinder 40 attached to the outer end 45 of the actuator 34, and a hydraulic line 50 interconnecting the cylinder 40 and the hydraulic brake system (see FIGURE 6).

Details of the mechanical control means will be described with reference to FIGURES 1, 3, 4, and 5. Pedal 44 includes a vertical post 49 slidingly mounted in a guide 51 which in turn is secured to the tractor frame shown as 49a.

A bracket 55 secured to the frame 49a has pivotally mounted thereon a pair of arms 52 and 53 which are arranged to cooperate with the pedal 44. Arm 52 has one slotted end connected to the lower end of post 49 by a pin 54 (see FIGURE 1). The opposite end of arm 52 is clamped to a rockshaft 56 journaled to the bracket 55. Extending radially outwardly from rockshaft 56 and in a direction diametric to that of arm 52 but at a position axially spaced therefrom is another arm 57 (see FIGURE 5). The distal end of arm 57 is pinned to the upper end of a link 58 which has its lower end operatively connected to the bell crank 42. The fulcrum of the bell crank 42 is about a pin 59 secured to the housing 41. A downwardly depending plate 60 abuts the rounded end of end 45 thereby completing the mechanical linkage from the actuator pedal 44 to the locking member 33. Thus it will be appreciated that downward movement of the pedal 44 is translated through the linkage comprising arm 52, rockshaft 56, arm 57, link 58, bell crank 42, and actuator 34 to the locking member 33.

The pedal 44 and its associated linkage are maintained in either the raised position (unlocking position) or the fully depressed position (locking position) by means of a conventional over-center assembly comprising arm 53 and tension spring 62 (see FIGURE 4). A slotted end of arm 53 is pinned to bracket 55 and the opposite end is connected to spring 62. In either over-center position, the bias of spring 62 acting between arm 53 and shaft 56 urges the plate 60 into constant engagement with end 45 of actuator 34.

As best seen in FIGURE 2, the hydraulic cylinder 40 includes a housing 41 in which is formed a cylinder 46, and a piston 47 movably mounted in the cylinder 46. The piston 47 is secured to end 45 of arm 34 by means of a snap ring 61. The piston 47 has a sleeve portion 47a passing through the brake housing 37.

A passage 48 formed in the housing 41 interconnects cylinder 46 and line 50. Hydraulic flow through passage 48 enters the cylinder 46 on the sleeve side of piston 47. The resulting hydraulic force overcomes the bias force of the spring 62 shifting the piston 47 and hence the locking member 33 to the right (see FIGURE 1) to the unlocked position.

As schematically illustrated in FIGURE 6, the hydraulic controls for actuating the differential lock is connected in circuit with the hydraulic system of the tractor brakes. The brake 28 is connected in circuit with a brake valve 63 which is mechanically actuated by its associated pedal 64, and the brake 29 is similarly connected to valve 65 which is mechanically actuated by its associated pedal 66. The brake system which includes the brake valves 63 and 65, the brake pedal 64 and 66, and hydraulic pump and lines (diagrammatically presented) form no part of the present invention and are therefore described only generally to indicate the relationship of the tractor brake system and the differential lock. The hydraulic line 50 connected to passage 48 junctions with tractor hydraulic system at 67. It should be observed that actuation of either brake valve 63 or 65 energizes line 50 and hence the hydraulic cylinder 40.

The operation of the differential lock in relation to the differential and the tractor brake system will be described with reference to FIGURES 1 and 6. When a slippery area is encountered and it becomes desirable to obtain traction from both rear wheels, the operator depresses pedal 44 which through the mechanical linkage forces the actuator 34 and hence the locking member 33 to the locking position wherein the side gears 19 and 20 are positively interlocked. In the locked position the spring 62 has passed over-center and maintains the mechanical linkage in the depressed position. Now when the difficult area is cleared and it becomes desirable to have the differential operative, the operator merely depresses both or either brake pedal 64 or 66 which energizes both or either of the brakes 28 or 29 as well as the hydraulic cylinder 40. Hydraulic flow to the hydraulic cylinder 40 forces the piston 47 outwardly shifting the actuator 34 and the locking member 33 to the unlocked position. Movement of the actuator arm 34 acting through bell crank 42 and linkage 43 also shifts the pedal 44 to its raised, unlocked position. The spring 62 maintains the pedal 44 and linkage 43 in the unlocked position.

Although the preferred embodiment of this invention has been described in particular detail, it should be observed that modifications and alterations may be made therein without departing from the spirit and scope of this invention as embodied in the appended claims.

What is claimed is:

1. In a vehicle of the type having a power train for driving a pair of axles, said power train including a selectively lockable and unlockable differential having first and second output members respectively drivingly connected to said axles, and a brake system including an actuator pedal, the improvement for selectively locking and unlocking said differential, comprising:

a locking structure including a locking member disposed intermediate said output members, and an actuator operatively connected to said locking member, a first control means operative upon said actuator for moving said locking member to a locked position wherein said locking member is disposed in an intermeshed relation with both of said output members so that said output members are driven in concert; and a second control means operative upon said actuator for moving said locking member to an unlocked position to disrupt said intermeshed relation of said locking member to said output members so that said output members can be driven at different speeds, said second control means being operatively responsive to actuation of said brake system actuator pedal.

2. The improvement as recited in claim 1 wherein said brake system is of the hydraulic type; said second control means includes a hydraulically actuable means connected to said actuator, and connection means interconnecting said hydraulic brake system and said hydraulically actuable means whereby energization of said brake system moves said locking member to said unlocked position.

3. The improvement as recited in claim 2 wherein said hydraulically actuable means includes:

a housing having a cylinder formed therein;

a piston reciprocable in said cylinder, said piston being secured to said actuator so that movement of said piston is translated to said locking member;

means responsive to actuation of said brake system for moving said piston in one direction;

said first control means including a mechanical linkage for moving said piston in a direction opposite said one direction;

said locking member being movable from said unlocked position to said locked position in response to movement of said piston in said opposite direction, and said locking member being movable from said locked position to said unlocked position in response to movement of said piston in said one direction; and means for biasing said member in both said locked and unlocked positions.

4. The improvement as recited in claim 2 wherein said first control means includes means manually operable to move said locking member to said locked position.

5. The improvement as recited in claim 4 wherein said manually operable means includes a pedal, and a linkage interconnecting said pedal and said actuator whereby actuation of said pedal moves said locking member to said locked position.

6. In a vehicle of the type having a hydraulic brake system including a manually actuable brake pedal, a power train for connecting a drive shaft of said vehicle to a pair of axles, said power train comprising:

a selectively lockable and unlockable differential drivingly connected to said drive shaft, said differential having confronting bevel gears for driving said rear axles;

means for locking said differential wherein said bevel gears and said rear axles are driven concurrently;

manually actuable means for moving said locking means to a locking position; and hydraulic means for moving said locking means to an unlocked position, said hydraulic means being in communication with said brake system whereby actuation of said hydraulic means is responsive to energization of said braking system, said hydraulic means and said manually actuable means being independently operable upon said locking means.

7. A power train as recited in claim 6 wherein said locking means includes a locking member disposed internally of said differential, an actuator having an inner end connected to said locking member and an outer end connected to said manually actuable means and said hydraulic means, manually actuable means being operative upon said actuator to move said locking member to mesh with both of said bevel gears, and said hydraulic means being operative upon said actuator to move said locking member to mesh with only one of said bevel gears.

8. A power train as recited in claim 7 and further comprising:

a pair of pinion shafts respectively connected to said bevel gears, each of said shafts including a pinion drivingly connected to one of said axles, said actuator extending concentrically through one of said pinion shafts, said outer end of said actuator being axially, outwardly spaced from the outer extremity of said one of said pinion shafts.

References Cited

UNITED STATES PATENTS

| | | | |
|---|---|---|---|
| 2,830,670 | 4/1958 | Ferguson | 74—710.5 XR |
| 3,292,720 | 12/1966 | Harvey | 74—710.5 XR |

BENJAMIN W. WYCHE III, Primary Examiner

U.S. Cl. X.R.

74—710.5; 180—75